United States Patent
Pulapura et al.

(10) Patent No.: US 11,359,050 B2
(45) Date of Patent: *Jun. 14, 2022

(54) SYNTHESIS OF TYROSINE DERIVED POLYARYLATES

(71) Applicant: MEDTRONIC, INC., Minneapolis, MN (US)

(72) Inventors: Satish Pulapura, Bridgewater, NJ (US); Fatima Buevich, Highland Park, NJ (US); Xiangji Chen, Plymouth, MN (US); Suping Lyu, Maple Grove, MN (US)

(73) Assignee: MEDTRONIC, INC., Minneapolis, MN (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/936,858

(22) Filed: Jul. 23, 2020

(65) Prior Publication Data

US 2020/0354514 A1 Nov. 12, 2020

Related U.S. Application Data

(63) Continuation of application No. 15/972,836, filed on May 7, 2018, now Pat. No. 10,793,670.

(60) Provisional application No. 62/516,284, filed on Jun. 7, 2017.

(51) Int. Cl.
*C08G 63/81* (2006.01)
*C08G 63/16* (2006.01)
*C08G 63/685* (2006.01)

(52) U.S. Cl.
CPC ......... *C08G 63/81* (2013.01); *C08G 63/6856* (2013.01)

(58) Field of Classification Search
None
See application file for complete search history.

(56) References Cited

U.S. PATENT DOCUMENTS

| | | | |
|---|---|---|---|
| 5,099,060 A | 3/1992 | Kohn et al. | |
| 5,317,077 A | 5/1994 | Kohn et al. | |
| 6,359,102 B1 | 3/2002 | Kemnitzer et al. | |
| 10,793,670 B2 * | 10/2020 | Pulapura | C08G 63/6856 |
| 2006/0083881 A1 | 4/2006 | Saito et al. | |
| 2014/0316086 A1 * | 10/2014 | Qin | C08F 236/06 |
| | | | 526/151 |

FOREIGN PATENT DOCUMENTS

| | | |
|---|---|---|
| EP | 1908490 A1 | 4/2008 |
| EP | 1484080 B1 | 8/2008 |
| WO | 2010006249 A1 | 1/2010 |

OTHER PUBLICATIONS

International Search Report and Written Opinion of the International Searching Authority, European Patent Office, PCT/US2018/031579, dated Dec. 19, 2019.
PCT/US2018/031579—International Search Report, Written Opinion of the International Searching Authority, EPO, Rijswijk, NL dated Aug. 24, 2018.
China National Intellectual Property Administration, Application/Patent No. 201880032572.4, Notice on the First Office Action, dated Nov. 3, 2021.

* cited by examiner

*Primary Examiner* — Tae H Yoon
(74) *Attorney, Agent, or Firm* — Sorell, Lenna & Schmidt, LLP

(57) ABSTRACT

A method for preparing tyrosine derived polyarylates includes combining a desaminotyrosyl-tyrosine ethyl ester, a desaminotyrosyl-tyrosine benzylester, succinic acid and a catalyst in a flask to produce a first mixture. Methylene chloride is added to the first mixture to produce a first suspension. Diisopropylcarbodiimide (DIPC) is added to the first mixture to produce a first solution. The first solution is added to a non-solvent to produce a precipitate. The precipitate is dissolved in methylene chloride to form a polymer solution. The polymer solution is blended with a slurry to produce polymer shreds. The polymer shreds are blended with a second slurry to produce a tyrosine derived polyarylate.

19 Claims, No Drawings

SYNTHESIS OF TYROSINE DERIVED POLYARYLATES

CROSS-REFERENCE TO RELATED APPLICATIONS

This application is a continuation of U.S. patent application Ser. No. 15/972,836, filed May 7, 2018, now U.S. Pat. No. 10,793,670, which claims priority from U.S. Provisional Application No. 62/516,284 filed Jun. 7, 2017 which is incorporated herein by reference, in its entirety.

TECHNICAL FIELD

The present disclosure generally relates to methods by which tyrosine derived polyarylates are synthesized with significantly improved yield and purity.

BACKGROUND

Conventional methods to synthesize tyrosine derived polyarylates are often very time consuming and often result in low yield and/or purity. This disclosure describes an improvement over these prior art technologies.

SUMMARY

In one embodiment, in accordance with the principles of the present disclosure, a method is provided for preparing a tyrosine derived polyarylate having the formula:

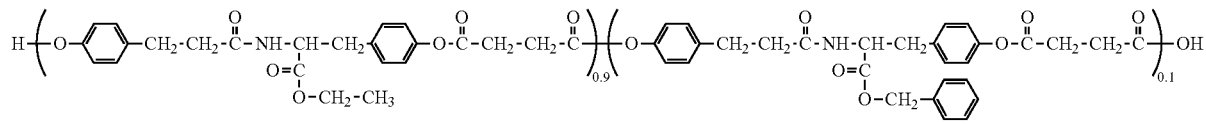

The method includes combining a desaminotyrosine-tyrosine ethyl ester having the formula:

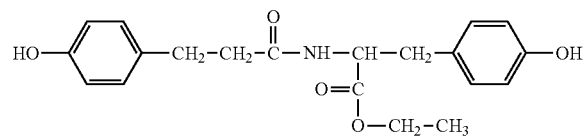

a desaminotyrosyl-tyrosine benzylester having the formula:

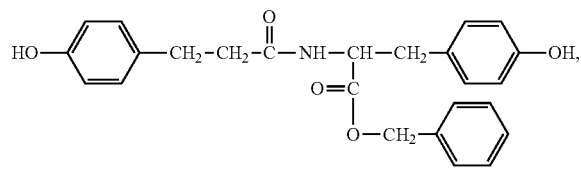 [SMILES: O=C(CCc1ccc(O)cc1)NC(Cc1ccc(O)cc1)C(=O)OCc1ccccc1]

succinic acid and a catalyst in a flask to produce a first mixture. Methylene chloride is added to the first mixture to produce a first solution. Diisopropylcarbodiimide (DIPC) is added to the first solution to produce a second solution. The second solution is added to a non-solvent to produce a precipitate. The precipitate is dissolved in methylene chloride to form a polymer solution. The polymer solution is blended with a slurry to produce polymer shreds. The polymer shreds are blended with a second slurry to produce the polyarylate.

In some embodiments, in accordance with the principles of the present disclosure, a method for preparing a polyarylate having the formula:

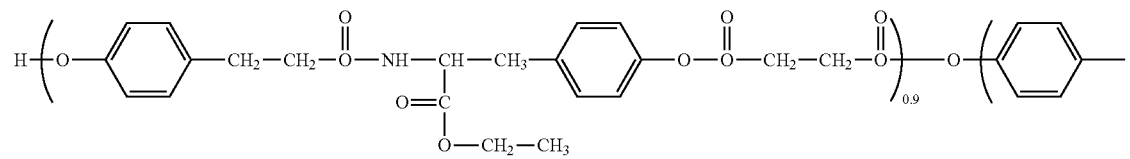

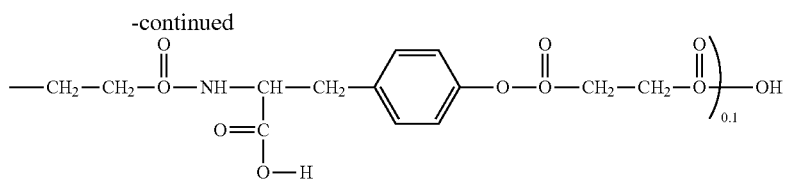

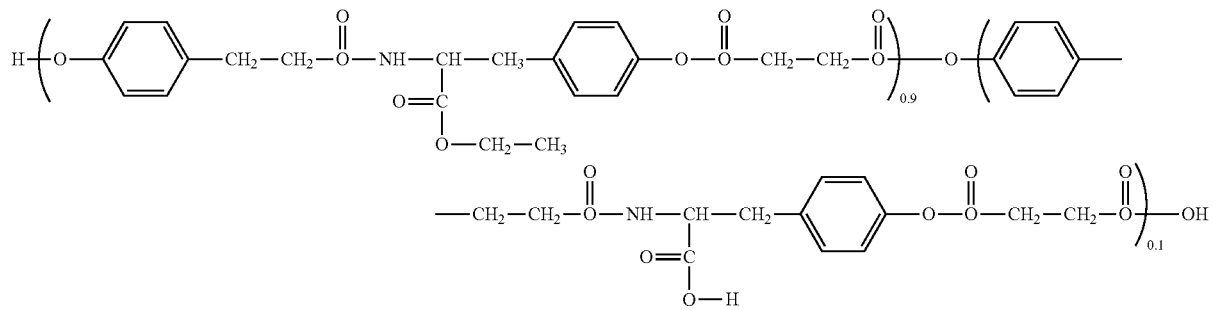

is provided. The method includes dissolving a second polyarylate having the formula:

with DMF to produce a first solution; starting a flow of nitrogen; adding a catalyst to the first solution to produce a polymer solution; starting a flow of hydrogen; filtering the polymer solution through a filtration agent to produce a filtrate; and adding the filtrate to water and stirring to precipitate the polyarylate. A first amount of the catalyst is added to the first solution to produce a first catalyst suspension. A second amount of the catalyst is added to the first catalyst suspension to produce a second catalyst suspension. A third amount of the catalyst is added to the second catalyst suspension to produce a third catalyst suspension. In some embodiments, the first amount is greater than the second amount and the second amount is greater than the third amount. In some embodiments, the first catalyst suspension is stirred for about 5.5 hours before adding the second amount of the catalyst to the first catalyst suspension; the second catalyst suspension is stirred overnight before adding the third amount of the catalyst to the second catalyst suspension; and the third catalyst solution is in suspension for about 1.75 hours. In some embodiments, the method further comprises drying the polymer shreds under a stream of air for about 24 hours and then under vacuum. In some embodiments, the first solution includes DMF and a solvent. In some embodiments, the solvent comprises methanol or acetic acid. In some embodiments, the solvent comprises 20% of the first solution by volume. In some embodiments, the method further includes adding a scavenger to remove leached catalyst. In some embodiments, the scavenger is added before the polymer solution is filtered. In some embodiments, the scavenger comprises a metal scavenger. In some embodiments, the step of adding the first amount occurs before the flow of nitrogen is started. In some embodiments, the step of adding the first amount occurs after the flow of nitrogen is started. In some embodiments, the step of adding a scavenger occurs before filtering the polymer solution. In some embodiments, the step of adding a scavenger occurs after filtering the polymer solution. In some embodiments, the step of adding a scavenger occurs after precipitating the polyarylate.

DETAILED DESCRIPTION

For the purposes of this specification and appended claims, unless otherwise indicated, all numbers expressing quantities of ingredients, percentages or proportions of materials, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding the numerical ranges and parameters set forth herein, the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

Reference will now be made in detail to certain embodiments of the invention. While the invention will be described in conjunction with the embodiments discussed herein, it will be understood that the embodiments discussed herein are not intended to limit the invention to those embodiments. On the contrary, the invention is intended to cover all alternatives, modifications, and equivalents that may be included within the invention as defined by the appended claims.

In one embodiment, in accordance with the principles of the present disclosure, a method is provided for preparing a tyrosine derived polyarylate having the formula:

The method includes combining a desaminotyrosyl-tyrosine ethyl ester having the formula:

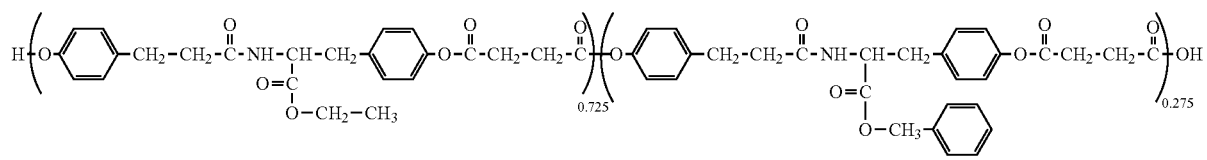

The method includes combining a desaminotyrosyl-tyrosine ethyl ester having the formula:

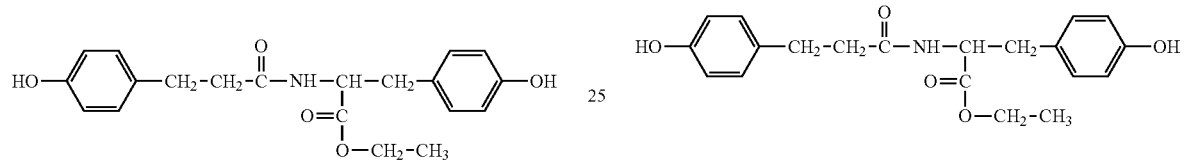

a desaminotyrosyl-tyrosine benzylester having the formula:

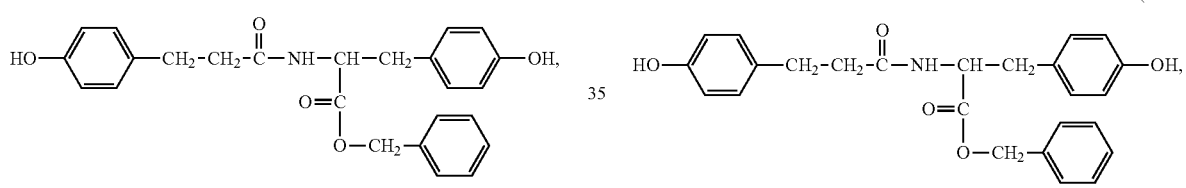

(DTE)

a desaminotyrosyl-tyrosine benzylester having the formula:

(DTBn)

succinic acid and a catalyst in a flask to produce a first mixture. Methylene chloride is added to the first mixture to produce a first solution. Diisopropylcarbodiimide (DIPC) is added to the first solution to produce a second solution. The second solution is added to a non-solvent to produce a precipitate. The precipitate is dissolved in methylene chloride to form a polymer solution. The polymer solution is blended with a slurry to produce polymer shreds. The polymer shreds are blended with a second slurry to produce the polyarylate.

In another embodiment, in accordance with the principles of the present disclosure, a method is provided for preparing a tyrosine derived polyarylate having the formula:

succinic acid and a catalyst in a flask to produce a first mixture. Methylene chloride is added to the first mixture to produce a first solution. Diisopropylcarbodiimide (DIPC) is added to the first solution to produce a second solution. The second solution is added to a non-solvent to produce a gum. The gum is dissolved in methylene chloride to form a polymer solution. The polymer solution is blended with a slurry to produce polymer shreds. The polymer shreds are blended with a second slurry to produce the polyarylate.

It has been found that the addition of solvents such as DMF or NMP slows down the reaction rate and that this rate is dependent on the amount of the cosolvent added. This affords a convenient way to control MW. The in-process

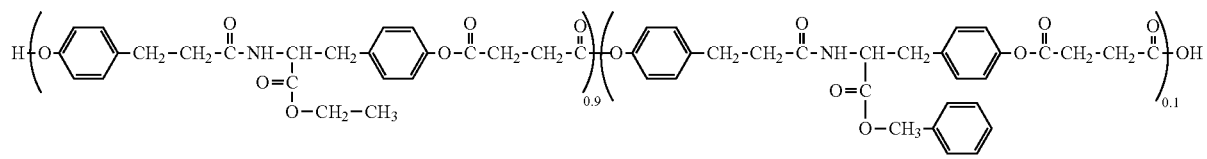

molecular weight can be monitored using on-line Gel Permeation Chromatography. Alternately, an in-line rheometer can be used after setting up a calibration curve between molecular weight and viscosity. Since the viscosity of the reaction mixture will increase as the molecular weight increases, the torque required to maintain a constant stir speed can be measured and related to molecular weight. Since viscosity type measurements are temperature dependent, these measurements should be conducted at predefined temperatures.

In some embodiments, the first solution comprises a stoichiometric ratio of 1 mole of the desaminotyrosyl-tyrosine ethyl ester and the desaminotyrosyl-tyrosine benzylester to 1 mole of the succinic acid. In some embodiments, the first solution comprises an excess of the succinic acid relative to the desaminotyrosyl-tyrosine ethyl ester and the desaminotyrosyl-tyrosine benzylester. In some embodiments, the first solution comprises a 1-5% excess of the succinic acid relative to the desaminotyrosyl-tyrosine ethyl ester and the desaminotyrosyl-tyrosine benzylester. In some embodiments, the first solution comprises a 2% excess of the succinic acid relative to the desaminotyrosyl-tyrosine ethyl ester and the desaminotyrosyl-tyrosine benzylester. In some embodiments, about 308.6 g of the desaminotyrosyl-tyrosine ester, about 40.3 g of the desaminotyrosyl-tyrosine benzylester and about 113.4 g of succinic acid are added to the flask to produce the first mixture. In some embodiments, about 0.864 moles of the desaminotyrosyl-tyrosine ester, about 0.096 moles of the desaminotyrosyl-tyrosine benzylester and about 0.96 moles of succinic acid are added to the flask to produce the first mixture.

It has been found that increasing the molar amount of the succinic acid makes it possible to build a high molecular weight polymer. In particular, during the course of the monomer synthesis, a common side product is the trimer. This compound has a molecular weight that is slightly higher than the corresponding diphenol. There are also additional unidentified impurities, most likely with reactive phenol groups. As such, when equimolar amounts of the succinic acid relative to the desaminotyrosyl-tyrosine ethyl ester and the desaminotyrosyl-tyrosine benzylester is used, it is difficult to consistently build a high molecular weight polymer. However, increasing the molar amount of the succinic acid presents one solution to this problem.

Due to the presence of other impurities that cannot be measured by High Performance Liquid Chromatography or impurities that can neutralize acid or react with OH, the actual COOH and OH ratio in the reaction mixture can vary significantly, which can produce inconsistent results. As such, in some embodiments, the method further comprises: titrating the succinic acid, the desaminotyrosyl-tyrosine ethyl ester and the desaminotyrosyl-tyrosine benzylester to obtain COOH and OH equivalent numbers; and adjusting the ratio of the succinic acid relative to the desaminotyrosyl-tyrosine ethyl ester and the desaminotyrosyl-tyrosine benzylester to maintain a constant COOH and OH ratio.

It has been found that it is not possible to target or control the molecular weight of the polymer within a tight range when the same ratio of the desaminotyrosyl-tyrosine ethyl ester and the desaminotyrosyl-tyrosine benzylester relative to the succinic acid is used. Consistent molecular weight is important to get tight control of elution kinetics of drugs formulated with polymers. It is also important where polymer processing depends on molecular weight, such as, for example, extrusion, spraying applications and casting or dipping applications. The molecular weights may be estimated as follows; melt viscosity for extrusion, dilute solution viscosity for spraying applications and solution viscosity for casting or dipping applications. As such, in some embodiments, the first mixture comprises about a 5% excess of the desaminotyrosyl-tyrosine ethyl ester and the desaminotyrosyl-tyrosine benzylester relative to the succinic acid; and the ratio of the succinic acid relative to the desaminotyrosyl-tyrosine ethyl ester and the desaminotyrosyl-tyrosine benzylester is adjusted until a 1:1.02 ratio of the desaminotyrosyl-tyrosine ethyl ester and the desaminotyrosyl-tyrosine benzylester is achieved. In some embodiments, the first solution comprises about a 1% to about a 5% excess of the desaminotyrosyl-tyrosine ethyl ester and the desaminotyrosyl-tyrosine benzylester relative to the succinic acid; and the ratio of the succinic acid relative to the desaminotyrosyl-tyrosine ethyl ester and the desaminotyrosyl-tyrosine benzylester is adjusted until a 1:1.02 ratio of the desaminotyrosyl-tyrosine ethyl ester and the desaminotyrosyl-tyrosine benzylester is achieved. In some embodiments, the reaction starts with a molar ratio of the desaminotyrosyl-tyrosine ethyl ester and the desaminotyrosyl-tyrosine benzylester relative to the succinic acid that is greater than 1. For example, the reaction can have about 5% more of the diphenol at the start. However, polymerization would stop when all the acid is used up, and a prepolymer with end group phenols would result. Addition of the diacid will restart the reaction and this process can be repeated until a 1:2 or 1:1.02 ratio of the succinic acid relative to desaminotyrosyl-tyrosine ethyl ester and the desaminotyrosyl-tyrosine benzylester is obtained, which would be the highest achievable molecular weight.

In some embodiments, the catalyst is a salt of dimethylaminopyridine and P-toluenesulfonic acid (DPTS). In some embodiments, the catalyst comprises about 84.8 g of DPTS. In some embodiments, the catalyst comprises about 0.288 moles of DPTS. In some embodiments, adding methylene chloride and NMP to the first solution comprises adding about 1370 ml of methylene chloride and about 375 ml of NMP to the first solution. In some embodiments, the method further comprises stirring the first mixture until solids dissolve. In some embodiments, adding DIPC to the first mixture comprises adding about 465 ml of DIPC to the first mixture. In some embodiments, adding DIPC to the first mixture comprises adding about 2.97 moles of DIPC to the first mixture.

In some embodiments, the method further comprises adding at least one acid to the first solution. In some embodiments, the at least one acid comprises at least one of succinic acid, adipic acid and glutaric acid. It has been found that the molecular weight of the prepolymer can be increased by adding different diacids to the first solution. As such, in some embodiments, the initial acid may be succinic acid and the next aliquot could be adipic acid, the aliquot after that can be glutaric acid. The same or other acids can be added in subsequent aliquots. This allows for the synthesis of many equivalent but dissimilar polymers by the same reaction, and can be useful to control polymer properties, such as, for example, hydrophobicity, degradation, surface energy, etc. In some embodiments, the method further comprises cooling the second mixture to room temperature and stirring the second mixture. In some embodiments, the second mixture is stirred overnight. In some embodiments, the method may include adding a diacid, such as, for example, the PEG bis acids and/or one or more of the other diacids disclosed in U.S. Pat. No. 8,952,106, the contents of which are expressly incorporated by reference herein, in its entirety.

In some embodiments, the method further comprises the diphenols (DTE and DTBn) in sequence. If the DTE and DTBn are added together at the start of the reaction, then it is expected that the DTE and DTBn blocks will be in the mole ratio of the starting monomers. So if we start a 3:1 ration of DTE and DTBn, then each repeat unit is expected to consist of 3 DTE units and 1 DTBn unit. If however, one were to add only DTBn at the start, then the initial structure would consist only of DTBn units. If one were to then add all the DTE, then the initial DTBn blocks would be connected by DTE blocks. The size- and composition of the blocks can be controlled by modifying the sequence and amounts of the different diphenols used.

In some embodiments, mixtures of diphenols and diacids can be used in the same way.

In some embodiments, reactive compounds with functionality greater than 2 may be used to give higher molecular weight. These compounds may be triphenols, triacids triamines or compounds with mixed functionalities (gallic acid, Tyrosine, Desaminotyrosyl tyrosine, Lysine).

Drying the reaction solvents, flushing the reactor with an inert gas like nitrogen after charging the solids (prior to adding the methylene chloride and the carbodiimide), and carrying out the reaction in an inert atmosphere have been found to be beneficial in making product with reproducible properties.

At long reaction times, the molecular weight distribution becomes broader and can become multimodal.

The diacids like succinic acid may be replaced by anhydrides (like succinic anhydride) or activated esters.

In some embodiments, the non-solvent comprises 2-propanol and methanol. In some embodiments, the non-solvent comprises 11 liters of 2-propanol and 1 liter of methanol. In some embodiments, the method further comprises: removing liquid from the gum; and washing the gum with the non-solvent. In some embodiments, the slurry comprises 2-propanol and dry ice.

In some embodiments, the non-solvent comprises ethyl acetate and acetonitrile. In some embodiments, the method further comprises: removing liquid from the gum; and washing the gum with the non-solvent.

In some embodiments, the method further comprises: dissolving the polymer in methylene chloride; blending the polymer solution and the slurry; collecting the polymer shreds; and filtering the polymer shreds using a course stainless steel mesh. In some embodiments, the second slurry comprises IPA and dry ice.

In some embodiments, the method further comprises collecting the polyarylate from the blended polymer shreds and second slurry and drying overnight under a stream of air. In some embodiments, the method further comprises dissolving the polyarylate in methylene chloride. In some embodiments, the method further comprises adding an acid to the polyarylate in methylene chloride to produce a second solution. In some embodiments, the acid is glacial acetic acid. In some embodiments, the method further comprises: washing the second solution; and precipitating the polyarylate. In some embodiments, the second solution is washed with 3×1500 ml portions of distilled water; and the polyarylate is precipitated using the slurry. In some embodiments, the method further comprises: collecting the precipitated polyarylate; dividing the precipitated polyarylate into two portions; blending each of the portions with cold water; collecting the polyarylate; and drying the polyarylate overnight in a stream of air and then under vacuum for about 24 to about 48 hours.

In some embodiments, the polyarylate solution is washed with distilled water containing sodium chloride (brine). The polyarylate is washed with distilled water after it is precipitated to remove any salt (NaCl) that may be trapped and is dried after the salt is removed. The washing may be carried out in a blender. If the salt is not effectively washed away, it will be carried over to the next step, such as, for example, a step in which the polyarylate is hydrogenated. If the polyarylate is to be used in any solvent based process like spraying, the salt must be filtered out first to prevent the salt from clogging the spray lines. If the salt is carried into products, it can have a negative impact on the functional properties of the polyarylate. For example, excess salt can increase the rate of drug elution or decrease the molecular weight stability by increasing water uptake. In some embodiments, 2-propanol is used in place of salt solution. That is, the method does not use salt at any point during the method. In such embodiments, the polyarylate can be used without filtering. In such embodiments, residual solvents may be removed by drying the polyarylate for a longer period of time, applying a vacuum, increasing the drying temperature and/or by more through washing of the precipitate, preferably in a high sheer blender.

In some embodiments, the product at the end of the reaction is treated with glacial acetic acid, in an amount sufficient to react with the excess carbodiimide present. The solution is filtered to remove the urea that is formed and the filtrate treated as discussed above.

In some embodiments, the solvent from reaction mixture is dried by vacuum distillation and the solid is cryomilled. Impurities in the resulting solid (unreacted monomers, low molecular weight polymer, catalyst DPTS), unreacted carbodiimide and urea are removed by extraction with a suitable solvent. A soxhlet type extraction apparatus can be used.

In some embodiments, the reaction mixture can be spray dried to obtain particles which can then be purified as described above.

In some embodiments, the side product urea can be removed by sublimation.

In some embodiments, the non-solvent is added to the reaction mixture slowly with vigorous stirring. The impurities stay in solution while the polymer is precipitated. The precipitated polymer can be collected and further purified as discussed above. This method is preferred when it is desired to remove lower molecular weight fractions of the polymer to give material with lower polydispersity and higher molecular weight.

Example 1

A polyarylate having the formula:

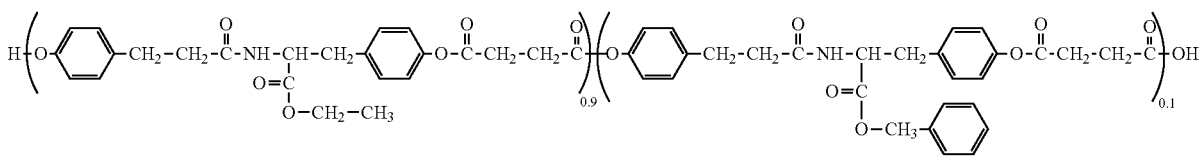

was synthesized using the materials in Table 1.

TABLE 1

| Reagents | Amounts (moles) |
|---|---|
| DTE | 308.6 g (0.864) |
| DTBenzyl | 40.3 g (0.096) |
| Succinic Acid | 113.4 g (0.96) |
| DPTS (catalyst) | 84.8 g (0.288) |
| Diisopropylcarbodiimide (DIPC) | 465 ml (2.97) |
| NMP | 375 ml |
| Methylene chloride | 1370 ml |
| 2-Propanol | 11 liters |
| Methanol | 1 liter |
| Glacial acetic acid | 20 ml |

DTE has the formula:

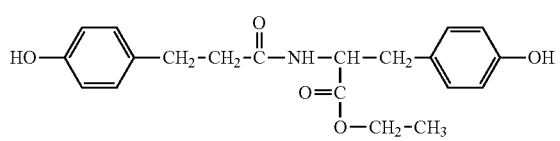

DTBenzyl has the formula:

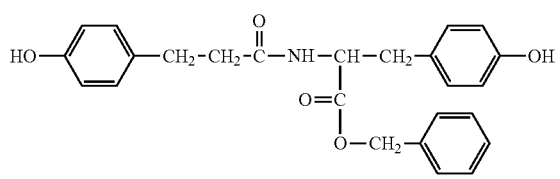

DTE, DTBenzyl, succinic acid, DPTS, methylene chloride and NMP were added to a 5 L 3-necked round-bottomed flask that is fitted with an overhead stirrer, thermometer and condenser in a water bath maintained at 25°-30° C. The contents of the flask were stirred for about 30 minutes until the solids dissolve. DIPC was added and within 10 minutes, the reaction started to boil, and urea started to precipitate. After about 30 minutes, the reaction was cooled back to room temperature. The reaction was stirred overnight. With stirring the polymer solution was added into 12 L of non-solvent (11 L 2-propanol+1 L methanol). The polymer precipitated as a sticky gum. The liquid was removed and the polymer was washed with 2 L of non-solvent. The liquid was removed and the precipitated polymer was dissolved in 2 L methylene chloride. 500 ml of the polymer solution was blended into 2700 ml of 2-propanol/dry ice slurry in a 4 L Waring blender at high speed. The polymer shreds were collected by filtering over a coarse (1 mm pores) stainless steel mesh. The reaming polymer solution was blended in 500 ml portions. The collected polymer shreds were combined and then divided into 2 parts and blended with 200 ml of IPA/dry ice slurry. The polymer was collected by filtrations and dried overnight under a stream air. The polymer was dissolved in 2 L methylene chloride. 20 ml glacial acetic acid was added and stirred for 5 minutes. The solution was washed with 3×1500 ml portions of distilled water. The water layers were discarded and the polymer was precipitated in 500 ml portions. The polymer was collected from the second blending and divided into 2 portions. Each portion was blended with 2×2 L of cold water. The polymer was collected by filtration and dried overnight under a stream of air and then under vacuum to constant weight (24 to 48 h). The yield of the polyarylate was about 360 g (85%).

The specifications of the polyarylate are shown in Table 2.

TABLE 2

| QC-Test | Specification |
|---|---|
| Appearance | White solid |
| MW | 30-40 Kdalton (relative to polystyrene in THF) |
| $^1$H NMR | Equivalent to standard |
| Residual volatiles | Less than 1% |
| Tg | 82 to 84° C. |

Example 2

A polyarylate having the formula:

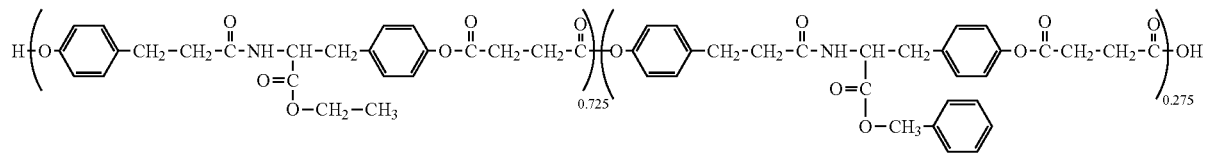

was synthesized using the materials in Table 3.

TABLE 3

| Reagents | Amounts |
|---|---|
| DTE | 1533.23 g |
| DTBenzyl | 682.65 g |
| Succinic Acid | 698.65 g |
| DPTS (catalyst) | 696.50 g |
| Diisopropylcarbodiimide (DIPC) | 2780 mL |
| Methylene chloride | 20,000 mL |
| 2-Propanol | 200 liters |
| Methanol | 40 liters |
| Glacial acetic acid | 433.25 |
| Water | 20 L |

The specifications of the polyarylate are shown in Table 4.

TABLE 4

| QC-Test | Specification |
|---|---|
| Appearance | White solid |
| MW | 140 Kdalton (relative to PEG in DMF with 0.1% TFA) |
| $^1$H NMR | Equivalent to standard BENZYL % = 27.4%) |
| Loss on Drying | 0.3% |

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. A method for preparing a polyarylate having the formula:

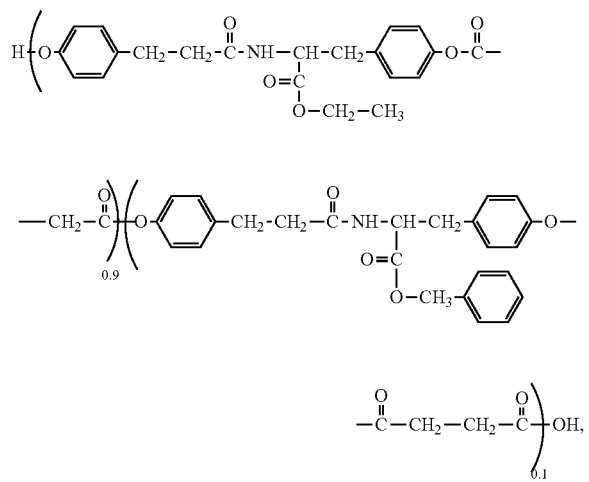

the method comprising:
combining a desaminotyrosyl-tyrosine ethyl ester having the formula:

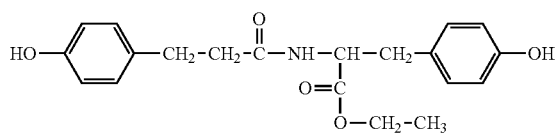

a desaminotyrosyl-tyrosine benzylester having the formula:

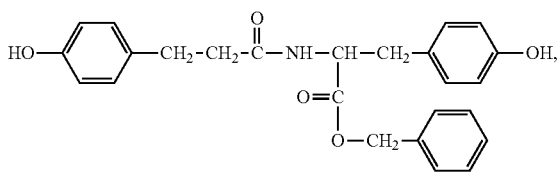 [SMILES: O=C(CCc1ccc(O)cc1)NC(Cc1ccc(O)cc1)C(=O)OCc1ccccc1]

succinic acid and a catalyst to produce a first mixture;
adding methylene chloride to the first mixture to produce a first suspension;
adding diisopropylcarbodiimide (DIPC) to the first mixture to produce a first solution;
adding the first solution to a non-solvent to polymerize the desaminotyrosyl-tyrosine ethyl ester and the desaminotyrosyl-tyrosine ethyl ester and produce a precipitate;
dissolving the precipitate in methylene chloride to form a polymer solution;
blending the polymer solution with a slurry of 2-propanol and dry ice to produce polymer shreds; and
blending the polymer shreds with a second slurry of 2-propanol and dry ice to produce the polyarylate.

2. A method as recited in claim 1, wherein the first mixture comprises a stoichiometric ratio of 1 mole of the desaminotyrosyl-tyrosine ethyl ester and the desaminotyrosyl-tyrosine benzylester to 1 mole of the succinic acid.

3. A method as recited in claim 1, wherein the first mixture comprises an excess of the succinic acid relative to the desaminotyrosyl-tyrosine ethyl ester and the desaminotyrosyl-tyrosine benzylester.

4. A method as recited in claim 1, wherein the first mixture comprises a 1-5% excess of the succinic acid relative to the desaminotyrosyl-tyrosine ethyl ester and the desaminotyrosyl-tyrosine benzylester.

5. A method as recited in claim 1, wherein the first mixture comprises a 2% excess of the succinic acid relative to the desaminotyrosyl-tyrosine ethyl ester and the desaminotyrosyl-tyrosine benzylester.

6. A method as recited in claim 1, wherein about 308.6 g of the desaminotyrosyl-tyrosine ester, about 40.3 g of the desaminotyrosyl-tyrosine benzylester and about 113.4 g of succinic acid are added to produce the first mixture.

7. A method as recited in claim 1, wherein desaminotyrosyl-tyrosine ester, desaminotyrosyl-tyrosine benzylester and succinic acid are added in the mole ratio 0.864:0.086:0.96 to produce the first mixture.

8. A method as recited in claim 1, further comprising:
titrating the first mixture to obtain COOH and OH equivalent numbers; and
adjusting the ratio of the succinic acid relative to the desaminotyrosyl-tyrosine ethyl ester and the desaminotyrosyl-tyrosine benzylester to maintain a constant COOH and OH ratio.

9. A method as recited in claim 1, wherein:
the first mixture comprises about a 5% excess of the desaminotyrosyl-tyrosine ethyl ester and the desaminotyrosyl-tyrosine benzylester relative to the succinic acid; and
the ratio of the succinic acid relative to the desaminotyrosyl-tyrosine ethyl ester and the desaminotyrosyl-tyrosine benzylester is adjusted until a 1:1.02 ratio of the desaminotyrosyl-tyrosine ethyl ester and the desaminotyrosyl-tyrosine benzylester is achieved.

10. A method as recited in claim 1, wherein:
the first mixture comprises about a 1% to about a 5% excess of the desaminotyrosyl-tyrosine ethyl ester and the desaminotyrosyl-tyrosine benzylester relative to the succinic acid; and
the ratio of the succinic acid relative to the desaminotyrosyl-tyrosine ethyl ester and the desaminotyrosyl-tyrosine benzylester is adjusted until a 1:1.02 ratio of the desaminotyrosyl-tyrosine ethyl ester and the desaminotyrosyl-tyrosine benzylester is achieved.

11. A method for preparing a polyarylate having the formula:

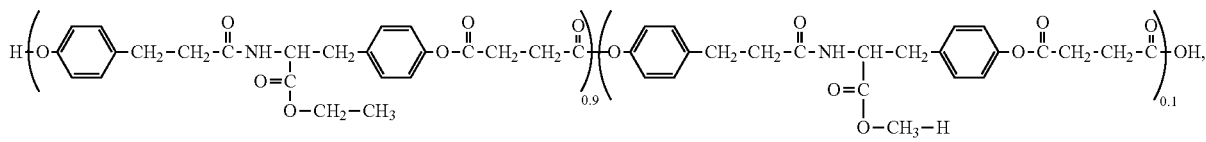

the method comprising:
dissolving a second polyarylate having the formula:

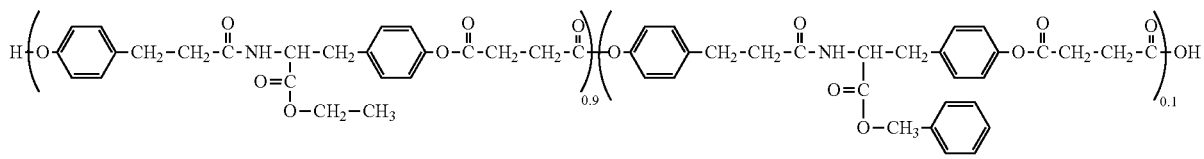

with DMF to produce a first solution;
starting a flow of nitrogen;
adding a catalyst to the first solution to produce a polymer solution;
starting a flow of hydrogen;
filtering the polymer solution to produce a filtrate; and
adding the filtrate to water and stirring to precipitate the polyarylate,
wherein a first amount of the catalyst is added to the first solution after the flow of nitrogen is started to produce a first catalyst suspension,
wherein a second amount of the catalyst is added to the first catalyst suspension to produce a second catalyst suspension,
wherein a third amount of the catalyst is added to the second catalyst suspension to produce a third catalyst suspension, and
wherein the first amount is greater than the second amount and the second amount is greater than the third amount.

12. A method as recited in claim 11, wherein:
the first catalyst suspension is stirred for about 5.5 hours before adding the second amount of the catalyst to the first catalyst suspension;
the second catalyst suspension is stirred overnight before adding the third amount of the catalyst to the second catalyst suspension; and
the third catalyst solution is in suspension for about 1.75 hours.

13. A method as recited in claim 11, further comprising drying the polyarylate having the formula:

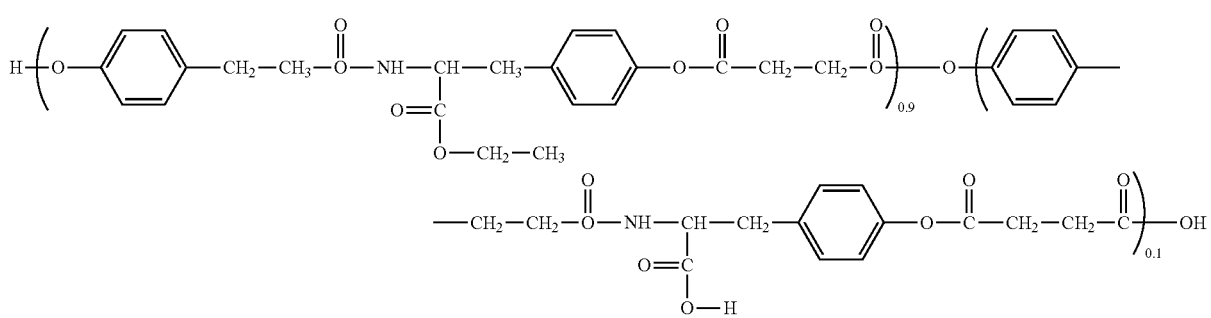

under a stream of air for about 24 hours and then under vacuum.

14. A method as recited in claim 11, wherein the first solution includes DMF and a solvent.

15. A method as recited in claim 14, wherein the solvent comprises methanol or acetic acid.

16. A method as recited in claim 14, wherein the solvent comprises 20% of the first solution by volume.

17. A method as recited in claim 11, further adding a scavenger to remove leached catalyst before filtering the polymer solution.

18. A method as recited in claim 17, wherein the scavenger comprises a metal scavenger.

19. A method for preparing a polyarylate having the formula:

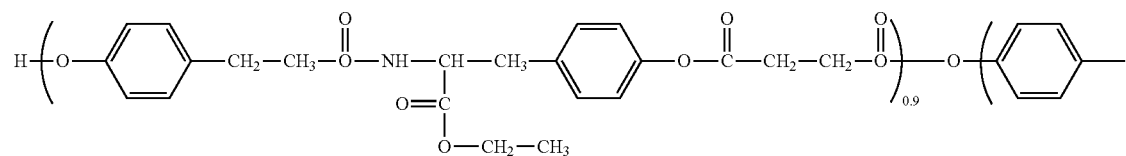

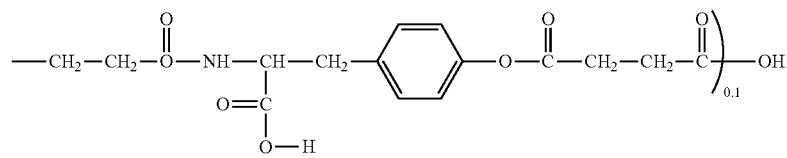

the method comprising:
dissolving a second polyarylate having the formula:

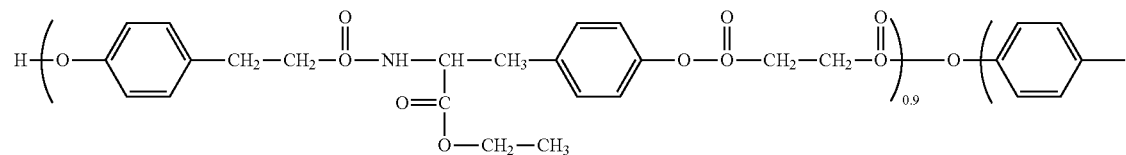

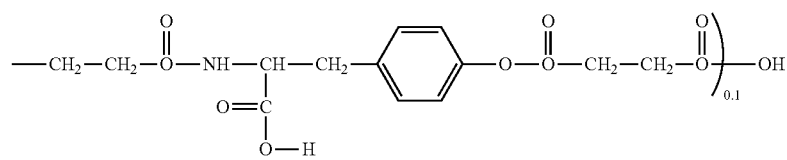

with DMF to produce a first solution;
   starting a flow of nitrogen;
   adding a catalyst to the first solution to produce a polymer solution;
   starting a flow of hydrogen;
   filtering the polymer solution to produce a filtrate; and
   adding the filtrate to water and stirring to precipitate the polyarylate,
   wherein a first amount of the catalyst is added to the first solution after the flow of nitrogen is started to produce a first catalyst suspension,
   wherein a second amount of the catalyst is added to the first catalyst suspension to produce a second catalyst suspension, and
   wherein a third amount of the catalyst is added to the second catalyst suspension to produce a third catalyst suspension.

* * * * *